(No Model.) 3 Sheets—Sheet 1.
J. A. HAYES
HAY PRESS.
No. 472,349. Patented Apr. 5, 1892.
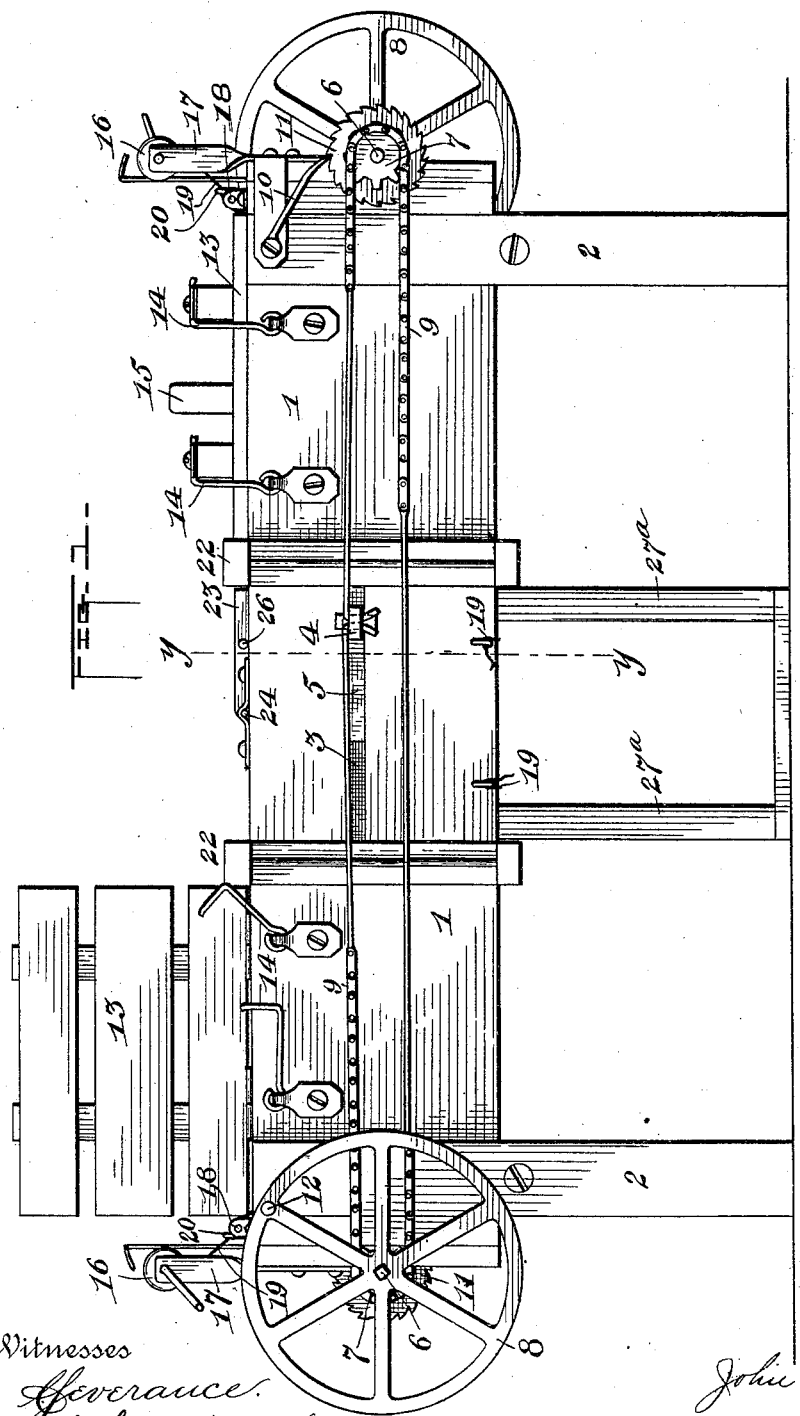
Witnesses
Severance
Calvert Hines
Inventor
John A. Hayes
By J. B. Sawyer, Attorney

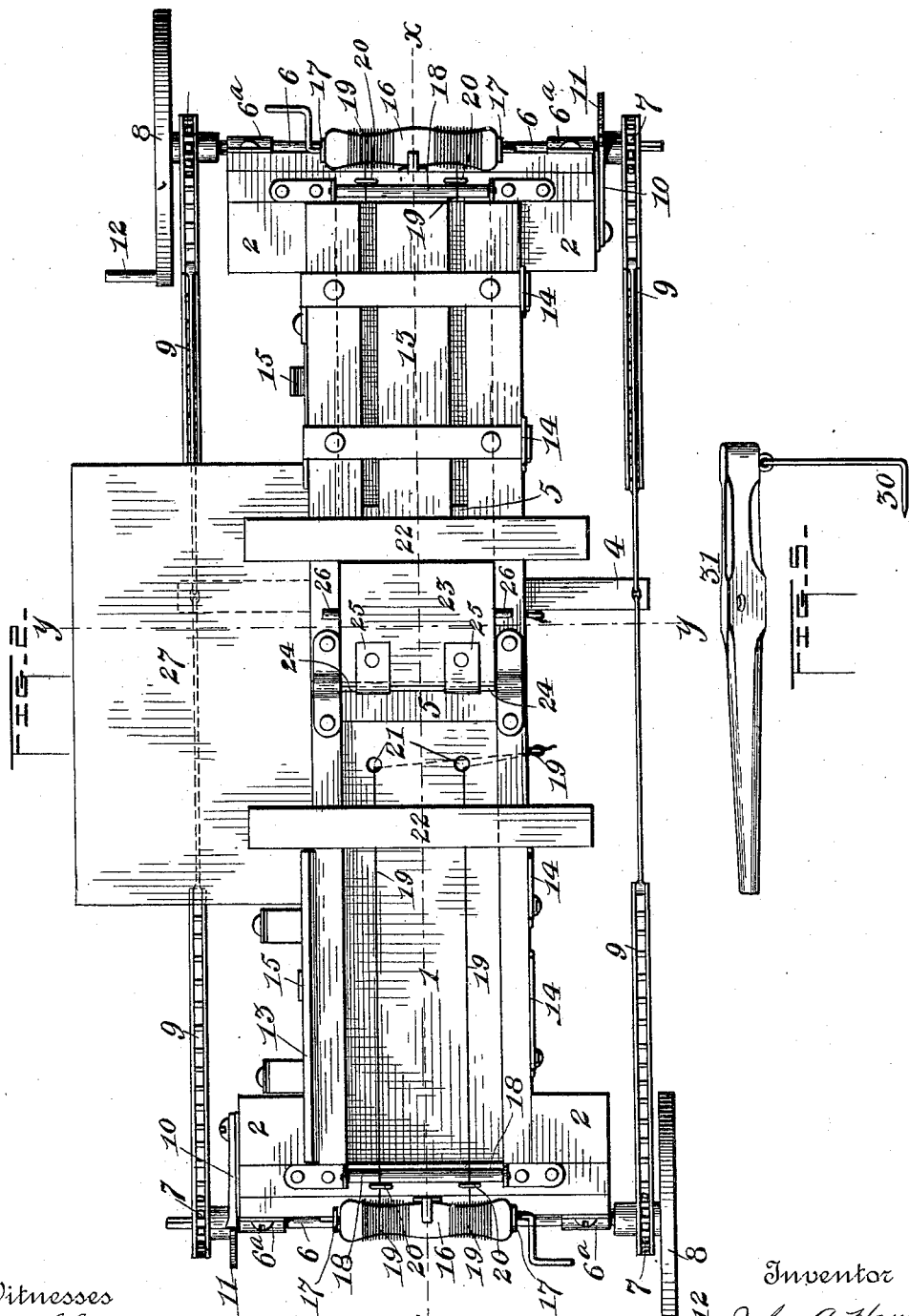

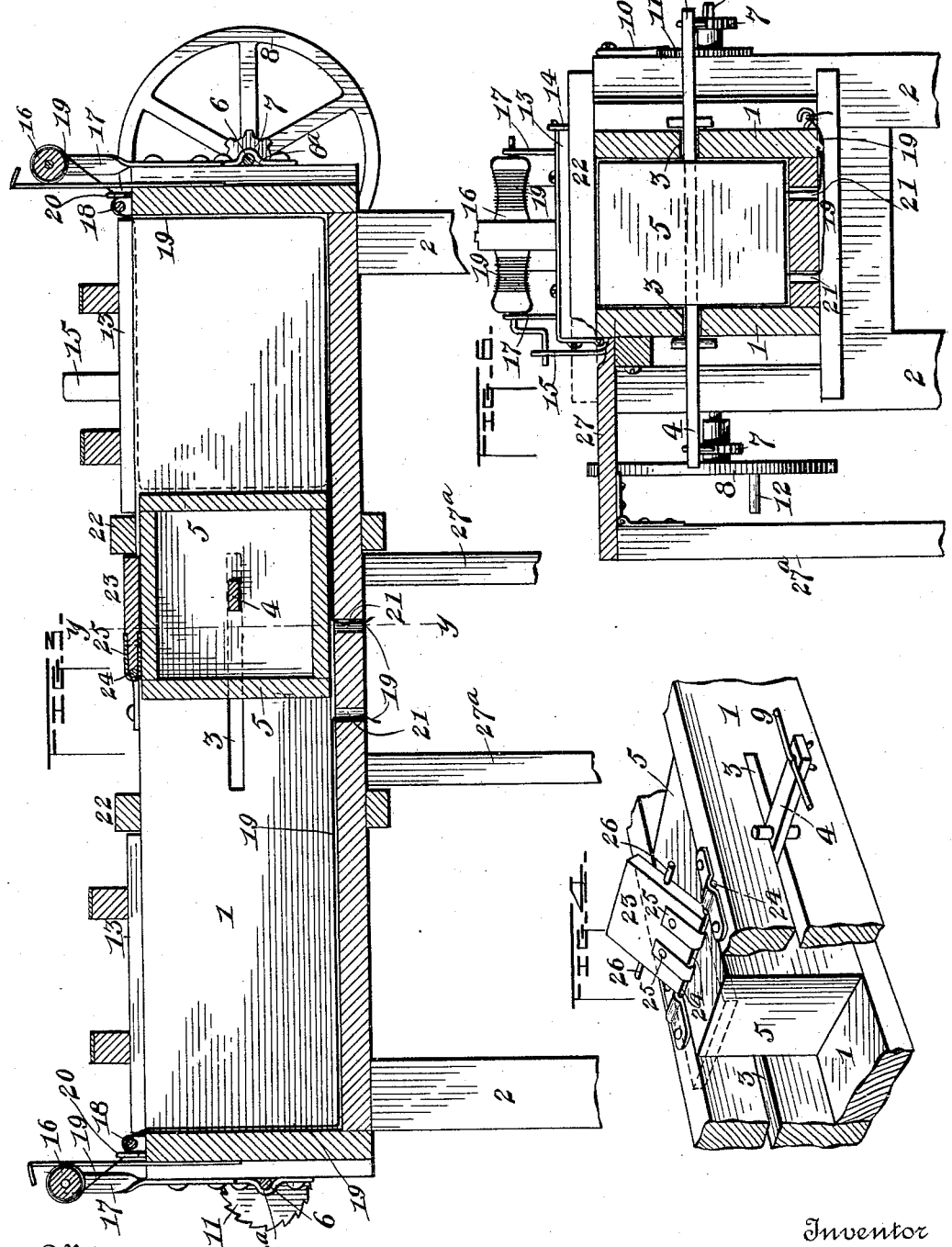

UNITED STATES PATENT OFFICE.

JOHN A. HAYES, OF ROGERS, ARKANSAS.

HAY-PRESS.

SPECIFICATION forming part of Letters Patent No. 472,349, dated April 5, 1892.

Application filed November 30, 1891. Serial No. 413,589. (No model.)

*To all whom it may concern:*

Be it known that I, JOHN A. HAYES, a citizen of the United States, residing at Rogers, in the county of Benton and State of Arkansas, have invented certain new and useful Improvements in Hay-Presses; and I do hereby declare the following to be a full, clear, and exact description of the invention, such as will enable others skilled in the art to which it appertains to make and use the same.

My invention has for its object to provide a new and useful construction in hay-presses whereby two bundles of hay may be simultaneously baled; and for this purpose it consists in the construction, arrangement, and combination of the parts of which it is composed, as will be hereinafter more fully described and claimed.

Referring to the accompanying drawings, in which corresponding parts are designated by corresponding numerals, Figure 1 is a side elevation of a press constructed in accordance with my invention. Fig. 2 is a plan view thereof, the hinged cover at one end of the baling-box being thrown open. Fig. 3 is a central longitudinal vertical section on line *x x* of Fig. 2. Fig. 4 is a detail perspective view of the plunger and the cover actuated by the movement thereof. Fig. 5 is a detail view of the dog for lifting out the baled hay. Fig. 6 is a transverse vertical section on line *y y*, Figs. 1, 2, and 3.

The baling-box 1 is supported at each end by the legs 2, one on each side thereof, the said box having closed sides, ends, and bottom. A slot 3 is formed in the middle portion of each side of the box, the said slots being longitudinal and being in alignment with each other, through which slots the arms 4, projecting from the opposite sides of the plunger 5, pass outwardly. The said plunger is of such a cross-section as to completely fill the interior of the box, and is of such a length as to occupy, when in the middle of its stroke, a small space in the middle of the baling-box, in the opposite ends of which box the hay is compressed.

A transverse shaft 6 is secured on each end of the baling-box by the housing 6ª, each of the said shafts having on each end a sprocket-wheel 7 and having its ends squared to receive a driving-wheel 8, two of which are shown in the drawings, one on each of the said shafts. The wheels 7 on the same sides of the baling-box are in alignment and receive the sprocket-chain 9, one of the links of which is connected to the arm 4, projecting from the corresponding side of the plunger through the longitudinal slot in the side of the baling-box, the said shafts being adapted to be locked against backward rotation by dogs 10 upon the sides of the box, engaging ratchet-wheels 11, one of which is mounted on each of the shafts 6. It will thus be seen that by imparting an alternating rotative motion to the driving-wheels 8 by means of the cranks 12 thereon or otherwise a reciprocating longitudinal motion will be imparted to the plunger, thus adapting the latter to compress a bale of hay at each end of its stroke.

Each end of the baling-box is provided with a hinged cover or door 13, adapted to be secured down by suitable catches 14, the said doors being limited in their opening movement by the upwardly-extending stops 15.

A windlass 16 is mounted on uprights 17 at each end of the baling-box, the said windlass being above the level of the top thereof, while a roller 18 is secured to the upper face of the baling-box at each end between the windlass upon that end of the box and the center of the latter. Each of the said windlasses carries two spools of wire, cord, &c., 19, the loose end of each of the wires being taken over the roller 18 upon the corresponding end of the baling-box and under the guide 20 thereon down through apertures 21 in the bottom of the central part of box, where they are secured in any desired manner.

Cross-bars 22 are laid across the top of the baling-box at the inner ends of the doors 13, while a cover 23 is hinged to the top of the baling-box by the transverse shaft 24, to which the cover 23 is secured by the straps 25, the said shaft 24 being placed above the center of the box and the center of the stroke of the plunger. The cover 23 has pins 26 projecting from the sides thereof, which are adapted to rest upon the tops of the sides of the box and to thus serve as stops. As is shown in the drawings, the cover 23, when the plunger is at one end of its stroke, rests upon the top of the sides toward the end of the box opposite to the end occupied by the plunger and is adapted to be thrown over toward the latter end of the box by the friction of the straps 25 upon the piston when the said piston or plunger begins its stroke, thus uncovering the space between the forwardly-moving end of the plunger and the cross-bar 22, into which space the loose hay may be fed, while upon again reversing the movement of the plunger the cover will be thrown back into its first position, permitting the hay to be fed to the opposite end of the box. A platform 27 projects from the central portion of one of the sides of the box and has supporting-legs 27ª.

Such being the construction of my invention, the method of its use is as follows: The plunger is reciprocated within the baling-box by means of an alternating rotary motion imparted to the driving-wheels in any suitable manner, while an operator stationed upon the platform 27 feeds the hay into the baling-box in front of the advancing plunger, the cover 23 being turned automatically by the motion of the plunger, thus uncovering the top of the box upon the proper side of the middle thereof for the insertion of the loose material. This having been continued until the hay at each end of the box has been compressed to proper extent, the plunger is stopped at one (say the left-hand) end of its path and the ends of the wire 19 at the right-hand end of the box are removed from the apertures 21 in the bottom of the box and are caught around the body of the bale above the bundle of hay. The wires are then tightened by the windlass 16, and the plunger is at the same time moved to the right-hand end of its stroke, (where it may be held by the dogs and ratchets 10 and 11,) thus compressing the bundle of hay and drawing the wires closely around it, when the ends of the wires are secured and the body of the wire cut, thus severing the connection between the bale and the windlass. The bale on the left-hand end of the press is then treated in a corresponding manner, after which the bales are removed from the baling-box by means of the dog shown in Fig. 5, the hook 30 thereof being inserted in the bale, while the handle 31 thereon rests upon the side of the box. Upon again inserting the ends of the wire through the apertures 21 and securing them in place the operation of the press, as above described, may be repeated.

It will be seen that in tightening the wires the rollers 18 take up the wires and prevent the latter from bearing directly on the ends of the box.

In the present application I do not claim the use of the windlasses for tightening the wire around the bale, as such a construction is described and claimed in an application filed by me in the United States Patent Office on the 18th day of September, 1891, and serially numbered 406,158.

Having thus described my invention, what I claim is—

1. In a hay-press, the combination, with a baling-box, of a double-headed plunger contained therein, a cover pivoted above the center of the stroke of the said plunger and adapted to be thrown on either side of its pivotal point by the motion thereof, and means for imparting a reciprocating motion to the said plunger, substantially as described.

2. In a hay-press, the combination, with a baling-box, of a double-headed plunger contained therein, a transverse shaft located above the center of the stroke of the said plunger, a cover for the said baling-box and straps encircling the said shaft and secured to the said cover, the under surface of the said straps bearing upon the said plunger, whereby upon a motion of the said plunger the cover will be thrown upon the opposite side of shaft, and means for imparting a reciprocating motion to the said plunger, substantially as described.

In testimony whereof I affix my signature in presence of two witnesses.

JOHN A. HAYES.

Witnesses:
   J. W. ROGERS,
   H. M. FRAZIER.